(12) United States Patent
Sahajwalla et al.

(10) Patent No.: US 11,667,057 B2
(45) Date of Patent: Jun. 6, 2023

(54) MANUFACTURE OF FILAMENT MATERIAL

(71) Applicant: NewSouth Innovations Pty Ltd, Sydney (AU)

(72) Inventors: Veena H Sahajwalla, Sydney (AU); Vaibhav Gaikwad, Sydney (AU); Anirban Ghose, Sydney (AU)

(73) Assignee: NewSouth Innovations Pty Ltd, Sydney (AU)

( * ) Notice: Subject to any disclaimer, the term of this patent is extended or adjusted under 35 U.S.C. 154(b) by 715 days.

(21) Appl. No.: 16/608,768

(22) PCT Filed: Apr. 27, 2018

(86) PCT No.: PCT/AU2018/050391
§ 371 (c)(1),
(2) Date: Oct. 25, 2019

(87) PCT Pub. No.: WO2018/195607
PCT Pub. Date: Nov. 1, 2018

(65) Prior Publication Data
US 2020/0198186 A1   Jun. 25, 2020

(30) Foreign Application Priority Data

Apr. 27, 2017 (AU) ................. 2017901528
Apr. 27, 2017 (AU) ................. 2017901529

(51) Int. Cl.
| | | |
|---|---|---|
| *B29B 17/00* | (2006.01) | |
| *B29B 17/04* | (2006.01) | |
| *B29B 17/02* | (2006.01) | |
| *B29K 23/00* | (2006.01) | |
| *B29K 69/00* | (2006.01) | |

(Continued)

(52) U.S. Cl.
CPC ...... *B29B 17/0026* (2013.01); *B29B 17/0412* (2013.01); *B29B 17/02* (2013.01); *B29K 2023/06* (2013.01); *B29K 2023/12* (2013.01); *B29K 2069/00* (2013.01); *B29K 2101/12* (2013.01); *B29K 2105/26* (2013.01); *B29K 2709/08* (2013.01); *B29K 2711/14* (2013.01)

(58) Field of Classification Search
None
See application file for complete search history.

(56) References Cited

U.S. PATENT DOCUMENTS

| | | |
|---|---|---|
| 8,138,232 B2 | 3/2012 | Maeurer et al. |
| 2003/0125399 A1 | 7/2003 | Zhang et al. |

(Continued)

FOREIGN PATENT DOCUMENTS

| | | |
|---|---|---|
| CN | 105219050 A | 1/2016 |
| CN | 106380776 A | 2/2017 |

(Continued)

OTHER PUBLICATIONS

International Search Report in International Application No. PCT/AU2018/050391, dated Aug. 8, 2018.

(Continued)

*Primary Examiner* — Robert J Grun
(74) *Attorney, Agent, or Firm* — Knobbe, Martens, Olson & Bear, LLP

(57) ABSTRACT

A method utilizes waste product in manufacturing, such as manufacture of filaments or micro-pellets for use in manufacturing applications such as additive manufacturing, extrusion, injection molding, blow molding and other applications.

15 Claims, 1 Drawing Sheet

(51) Int. Cl.
    *B29K 101/12*     (2006.01)
    *B29K 105/26*     (2006.01)
    *B29K 709/08*     (2006.01)
    *B29K 711/14*     (2006.01)

(56) References Cited

U.S. PATENT DOCUMENTS

2007/0054106 A1     3/2007   Armstrong et al.
2011/0210469 A1     9/2011   Keller

FOREIGN PATENT DOCUMENTS

JP     2010046894 A     3/2010
WO   WO 03/087215 A1   10/2003

OTHER PUBLICATIONS

Supplementary European Search Report in corresponding European Patent Application No. 18790882.7 dated Dec. 21, 2020.

MANUFACTURE OF FILAMENT MATERIAL

TECHNICAL FIELD

This disclosure relates to a method of utilising waste product in manufacturing. It is particularly suited to the manufacture of filaments or micro-pellets for use in manufacturing applications such as additive manufacturing, extrusion, injection moulding, blow moulding and other applications.

BACKGROUND OF THE DISCLOSURE

In the formation of recycled products, the varied quality, density, melting point, and other processing factors of varied waste materials means that high cost technology and/or complex equipment is required to satisfactorily clean or segregate waste materials for recycling. This is particularly significant in the recycling of complex products such as automotive waste and e-waste as well as complex glass and polymer waste. The result is significant costs in recycling and an inability to utilise a substantial portion of waste in recycling.

It is known to process certain waste into filaments or pellets for manufacturing, but the waste requires substantial sorting and screening for composition and particle size.

It is to be understood that a reference to the background and prior art does not constitute an admission that the background and prior art forms a part of the common general knowledge in the art, in Australia or any other country.

SUMMARY OF THE DISCLOSURE

Disclosed is a method of manufacturing a feedstock comprising: providing particles of unseparated waste material; mixing the particles of unseparated waste material to provide a quantity of recyclable waste material with a generally consistent composition across the material; air drying the recyclable waste material; and extruding the recyclable waste material to produce a feedstock for further manufacturing.

In some forms, the feedstock comprises a filament or any product having a diameter less than 5 mm including a wire, a micro-pellet, a small sphere or other feedstock product.

In some forms, the step of extruding is performed at a temperature low enough to maintain the integrity of at least a portion of the unseparated waste material.

In some forms, the process may handle waste plastics from various sources, including, but not limited to electronics, automotive, MSW, construction and demolition and textiles, and transform it into 1-dimensional filaments and feedstock pellets for manufacturing. In some forms the process may also incorporate metallic, ceramic, FRPs, GRPs, carbon fibre components as additives to enhance its properties or impart special attributes.

In some forms the feedstock comprises a matrix which is a complex polymer material comprising one or more of the following: thermoplastic polymers, acrylonitrile butadiene styrene, polyester, polylactic acid, styrene acrylonitrile, polypropylene, polyethylene, high density polyethylene, low density polyethylene, linear low density polyethylene, ultra high molecular weight polyethylene, polyvinyl chloride, polyethylene terephthalate, nylon, polystyrene, high impact polystyrene, etc.

In some forms additives include polycarbonate, polyoxymethylene (acetal), poly(methyl methacrylate), polyester, other crystalline polymers, waste glass, metal powders, ceramics, graphite, graphene, graphene oxide, fibre reinforced plastics (FRPs), glass reinforced plastics (GRPs), carbon reinforced plastics (CRPs), carbon fibre, gold (analytical waste), cellulose, wood and other bio fillers, slag, clay, toner, developer kit powder, iron or other metal fines.

In some forms at least a portion of the unseparated waste material is e-waste that has been size reduced to form particles. In some forms the e-waste material comprises polymers.

In some forms at least a portion of the unseparated waste material is automotive waste that has been size reduced to form particles. In some forms the automotive waste material comprises polymers.

In some forms, at least a portion of the unseparated waste material is a complex polymer material that has been size reduced to form particles. The complex polymer material may comprise two or more polymers selected from the group consisting of thermoplastic polymers, acrylonitrile butadiene styrene, polylactic acid, styrene acrylonitrile, polypropylene, polyethylene, high density polyethylene, low density polyethylene, linear low density polyethylene, ultra high molecular weight polyethylene, polyvinyl chloride, polyethylene terephthalate, nylon, polystyrene and high impact polystyrene. Preferably, the complex polymer material comprises acrylonitrile butadiene styrene or styrene acrylonitrile. In certain embodiments, the complex polymer material comprises acrylonitrile butadiene styrene and styrene acrylonitrile. In other embodiments, the complex polymer material comprises polyethylene terephthalate. In yet further embodiments, the complex polymer material comprises polyethylene or polypropylene. Preferably, the complex polymer material comprises polyethylene and polypropylene.

In some forms, the complex polymer material comprises at least about 40% (w/w) of the unseparated waste material, such as at least about 45% (w/w) or at least about 50% (w/w) or at least about 55% (w/w) or at least about 60% (w/w) or at least about 65% (w/w) or at least about 70% (w/w) or at least about 75% (w/w) or at least about 80% (w/w) or at least about 85% (w/w) or at least about 90% (w/w) or at least about 95% (w/w) of the unseparated waste material.

In some forms, the particles of unseparated waste material range in size.

In some forms, the method further comprises the step of mixing a further additive waste material into the recyclable waste material. The further additive waste material may be selected from the group consisting of polycarbonate, polyoxymethylene (acetal), poly(methyl methacrylate), polyester, a crystalline polymer, glass, metal powder, ceramic, graphite, graphene, graphene oxide, FRP, GRP, CRP, carbon fibre, gold, cellulose, wood, slag, clay, toner, developer kit powder and iron. Preferably, the further additive waste material is polycarbonate.

In some forms, the feedstock comprises a product having a diameter less than 5 mm.

In some forms, the feedstock is composed primarily of polymer.

In some forms, the step of extruding the material is performed at a temperature low enough to maintain the integrity of at least some of the unseparated waste material.

In certain embodiments, extrusion is performed at a temperature of between about 125° C. and 325° C., such as between about 150° C. and 300° C., or between about 150° C. and 275° C. Preferably, extrusion is performed at a temperature of between about 160° C. and 180° C.

In some forms, the complex polymer material comprises acrylonitrile butadiene styrene and styrene acrylonitrile, and extrusion is performed at a temperature of between about 195° C. and 225° C.

In some forms, the complex polymer material comprises polyethylene terephthalate, and extrusion is performed at a temperature of about 265° C.

In some forms, the complex polymer material comprises polyethylene and polypropylene, and extrusion is performed at a temperature of between about 160° C. and 180° C., optionally including water bath cooling.

Those skilled in the art will understand that extrusion speed may be varied depending on the composition of the waste material and the intended use of the feedstock without undue effort. In some embodiments, extrusion is performed at a speed of between about 10 rpm and 80 rpm, such as between about 15 rpm and 75 rpm or between about 20 rpm and 70 rpm or between about 25 rpm and 65 rpm or between about 30 rpm and 60 rpm or between about 35 rpm and 55 rpm. Preferably, extrusion is performed at a speed of between about 40 rpm and 45 rpm.

In some embodiments, the method produces a feedstock in the form of pellets. Such embodiments may be performed, for example, on a heated platen press. Those skilled in the art will understand that the temperature and pressure at which the pellets are formed may be varied depending on the composition of the waste material and the intended use of the pellets without undue effort. The pellets may be formed, for example, at a temperature of between about 125° C. and 275° C., such as between about 150° C. and 225° C. or between about 175° C. and 200° C. Preferably, the pellets are formed at a temperature of between about 185° C. and 195° C. In certain embodiments the pellets are formed at a pressure of between about 10 bar and 70 bar, such as between about 15 bar and 60 bar or about 20 bar and 50 bar. Preferably, the pellets are formed at a pressure of between about 30 bar and 40 bar, such as at a pressure of about 30 bar or about 40 bar.

In some forms, the complex polymer material comprises acrylonitrile butadiene styrene and styrene acrylonitrile, and the pellets are formed at a temperature of between about 185° C. and 195° C., and a pressure of about 40 bar.

Also disclosed is a feedstock manufactured by the methods described herein. The feedstock may be in the form of a filament or a pellet.

Also disclosed herein is a use of a feedstock manufactured by the methods described herein. The use may comprise additive manufacturing, extrusion, injection moulding, or blow moulding. Other uses may include metal production where elements such as carbon, gases such as CO, $CH_4$ and $H_2$, and oxides such as CaO and $TiO_2$ may be required. Those elements, gases and oxides may be sourced from the filaments or pellets manufactured by the methods described herein.

The process in some forms has the benefit of modifying waste materials into resources for further manufacturing. In some forms the process has the benefit of providing a feedstock composed substantially of plastic produced from at least a portion of waste material.

Waste plastics, particularly e-waste and automotive waste, complex glass, such as laminated windscreens, complex polymers—can in some forms produce high quality waste-based products for high quality 3D printing.

In some forms, the disclosure allows a user to produce filaments or other extruded products such as wires, pellets or spheres from unseparated waste of varying particle size and composition.

In some forms, the process minimizes transportation costs by capturing and/or processing materials closer to the first source of waste generation. The disclosed methods and systems can easily be set up close to the manufacturing company for treating waste locally.

In some forms, the disclosed processes and technologies can be deployed in small scale micro-factories or mobile micro-factory units.

Recovered material from local post-consumer as well as end-of-life woods or glass may be selected as the main raw materials and waste plastics or waste textile as binder. In some forms macro algae and mollusc wastes may be selected as secondary fillers in wood-plastic bio-composite to enhance performance.

In some forms, greater resource recovery rates at the end-of-life of a product or a building could be achieved if wood elements are specifically designed for disassembly and classification at the end of their service. In the disclosure, wood-plastic bio-composite waste materials (wood, plastic and marine waste such as seaweed and seashell) have been used which is completely recyclable and can be reused for producing wood-plastic bio-composite at the end of its life.

This bio-composite is designed for a consistent state of non-toxicity for end users, regarding chemical and biological VOCs (e.g. mould) for the whole product's lifespan.

BRIEF DESCRIPTION OF THE DRAWINGS

Non-limiting embodiments will now be described, by way of example only, with reference to the accompanying drawings in which.

DETAILED DESCRIPTION

Figure 1:
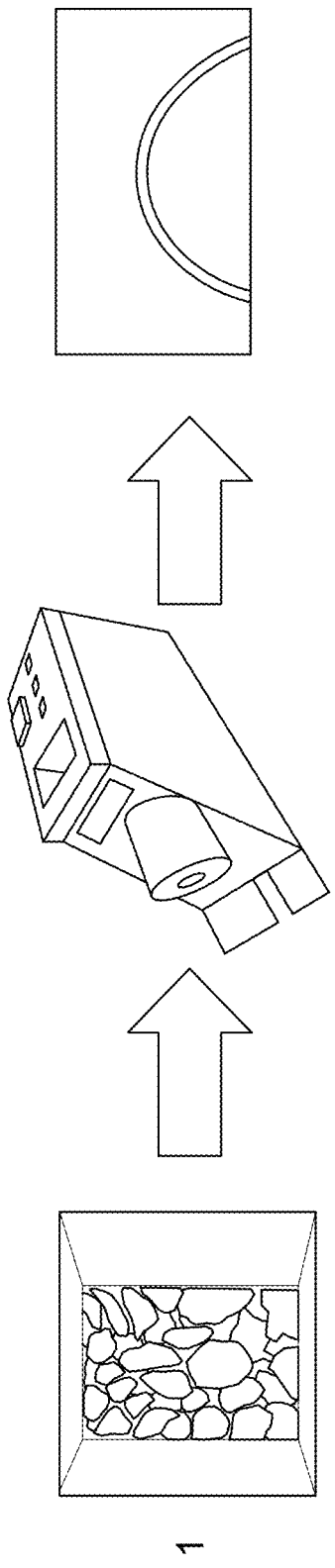
FIG. 1 shows a flow chart of a process of forming 1 dimensional filament.
Figure 1:
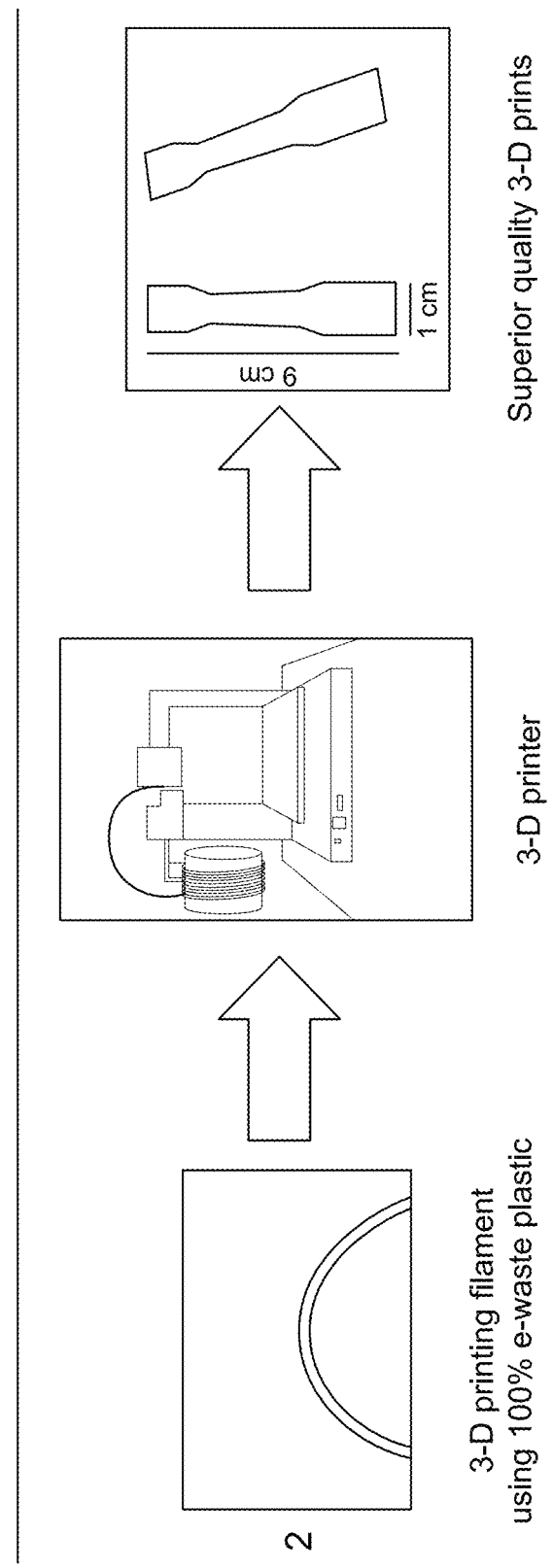

Disclosed is a method of manufacturing a feedstock product, the method comprising providing unseparated waste material such as, for example, electronic waste, automotive waste, complex plastic waste.

Conventional recycling processes require arduous sorting, collection and transport of waste—as well as expensive large scale industrial infrastructure—and mostly merely turn waste back into more of the same, glass back into more glass. The disclosed embodiments in some forms take complex materials and mixes of waste—without the need for sorting. This reduces the waste that is rapidly piling up in landfills because it cannot be easily and cost-effectively recycled.

Electronic waste is piling up around the world. More than 20 million tonnes of e-waste are produced every year. E-waste includes computers, mobile phones, televisions, fax machines, etc. This waste may be donated or sold for re-use, recycled, or disposed of, ending up in landfill. However e-waste is composed of complex polymers along with metals, glass and other mixed recyclables. Separating these into components for use in standard recycling is an expensive process.

The disclosure may be directed toward the preparation of filaments, pellets, wires, threads, spheres or other extruded products for use as feedstock or precursors for manufacturing such as 3D printing. In some form the products have a diameter less than 5 mm. In some forms the products have a diameter significantly less than 5 mm. In some forms the products are extruded with a cylindrical form such as wires or spheres or micropellets. In certain embodiments, the feedstock is a filament having a diameter of between about 0.1 mm and 10 mm, or preferably, between about 0.2 mm and 5 mm. In other embodiments, the feedstock is a pellet having a diameter of between about 1 mm and 30 mm, such as between about 5 mm and 25 mm, or preferably, between about 10 mm and 20 mm.

In the detailed description, reference is made to accompanying drawings which form a part of the detailed description. The illustrative embodiments described in the detailed description and depicted in the drawings are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

As shown in FIG. 1, the process of manufacturing a feedstock such as a filament, micro-pellet or other product comprises obtaining waste such as e-waste or other complex polymeric waste. In some forms the process comprises providing waste material sourced, for example, at a land fill. The waste material is reduced in particle size such that it has a suitable size for use in an extruder. The step of reducing the particle size can comprise cutting or chopping the material into pieces, crushing or grinding the product using, for example, a mill or crusher and other size reduction steps. The waste material is then mixed such that the composition throughout the quantity of waste material is substantially consistent in terms of material present. The waste is in some forms blended and subjected to size reduction using a shredder/granulator. The waste may comprise more than one type of waste from more than one source. The plastics component of the waste may comprise a complex polymer material which may include two or more polymers selected from the group consisting of thermoplastic polymers, acrylonitrile butadiene styrene, polylactic acid, styrene acrylonitrile, polypropylene, polyethylene, high density polyethylene, low density polyethylene, linear low density polyethylene, ultra high molecular weight polyethylene, polyvinyl chloride, polyethylene terephthalate, nylon, polystyrene and high impact polystyrene. The process may in some forms handle large variation in particle size, subject to the particle size not being larger than the auger input size.

The shredded/granulated waste and waste plastics may be dried using a conventional air-drying oven. In some forms the air drying occurs at approximately 60-70° C. for approximately 2 hours.

The mix is then introduced in the extruder, which is set to the required temperature and speed depending on the composition of the feedstock. In some forms the mix may comprise up to 100% waste or a substantial portion of waste material. In some forms the nozzle diameter on the die of the extruder can range anywhere up to 5 mm, such as between about 0.2 mm and 5 mm.

The extruded product may be produced as a continuous filament or may be pelletised. In some forms the product is in the form of wires with a cylindrical form or spheres.

Feedstock in the form of pellets may be produced, for example, on a heated platen press. Pellets having a diameter of, for example, between about 10 mm and 20 mm can be produced on a heated platen press.

The filament or pellets may in some cases be introduced to an additive manufacturer such as a 3D printer, or may be further manufactured through processes such as extrusion, injection moulding, blow moulding and other applications.

In some forms, other waste or non-waste material may be used as an additive.

Also disclosed is a manufacturing feedstock such as a filament or pellet comprising a mixture of waste products that may include polymers from e-waste or automotive waste.

Extrusion

Various unseparated waste materials have been successfully extruded into filaments and micropellets. Suitable extrusion temperatures for unseparated waste materials comprising different polymers are set out in Table 1.

TABLE 1

| Polymers | Extrusion temperature |
|---|---|
| acrylonitrile butadiene styrene (ABS)/ polycarbonate (PC)/styrene acrylonitrile (SAN) (and most styrenics) | 195° C. to 225° C. |
| polyethylene terephthalate (PET) | 265° C. |
| Polyethylene (PE)/polypropylene (PP) | 160° C. to 180° C. |

Extrusions were most commonly carried out at a speed of about 40 rpm to 45 rpm.

Compression Moulding

Pellets were also formed from various unseparated waste materials by compression moulding according the conditions set out in table 2.

TABLE 2

| Sample | Temperature | Pressure (bar) | Pressure time (min) |
|---|---|---|---|
| Toner + e-waste plastic (30:70, 40:60, 50:50) | 185° C. to 195° C. | 40 | 30 |
| Input weight: 3 g | | | |
| Pellet final weight: 2.5 g | | | |
| Diameter: 20 mm | | | |
| Thickness: 3 mm to 5 mm | | | |
| 100% toner | 185° C. | 30 | 30 |
| Input weight: 1 g | | | |
| Pellet final weight: 0.45 g to 0.5 g | | | |
| Diameter: 20 mm | | | |
| Thickness: 1 mm to 3 mm | | | |
| 100% e-waste plastic | 185° C. to 195° C. | 40 | 30 |
| Diameter: 20 mm | | | |
| Thickness: 2 mm to 5 mm | | | |

E-waste plastic comprises acrylonitrile butadiene styrene, polycarbonate and styrene acrylonitrile. Toner comprises plastics in the form of a bisphenol A-based polyester and a polystyrene-poly(methyl methacrylate) copolymer, as well as iron oxides.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The term "about" is understood to refer to a range of +/−10%, preferably +/−5% or +/−1% or, more preferably, +/−0.1%.

The invention claimed is:

1. A method of manufacturing a feedstock comprising:
providing particles of unseparated waste material;
mixing the particles of unseparated waste material to provide a quantity of recyclable waste material with a generally consistent composition across the material;
air drying the recyclable waste material; and
extruding the recyclable waste material to produce a feedstock for further manufacturing, wherein at least a portion of the unseparated waste material is e-waste that has been size-reduced to form particles.

2. The method of manufacturing a feedstock as defined in claim 1, wherein at least a portion of the unseparated waste material is automotive waste that has been size reduced to form particles.

3. The method of manufacturing a feedstock as defined in claim 1, wherein at least a portion of the unseparated waste material is a complex polymer material that has been size reduced to form particles.

4. The method of manufacturing a feedstock as defined in claim 3, wherein the complex polymer material comprises two or more polymers selected from the group consisting of thermoplastic polymers, polyester, acrylonitrile butadiene styrene, polylactic acid, styrene acrylonitrile, polypropylene, polyethylene, high density polyethylene, low density polyethylene, linear low density polyethylene, ultra high molecular weight polyethylene, polyvinyl chloride, polyethylene terephthalate, nylon, polystyrene and high impact polystyrene.

5. The method as defined in claim 3, wherein the complex polymer material comprises acrylonitrile butadiene styrene or styrene acrylonitrile.

6. The method as defined in claim 3, wherein the complex polymer material comprises at least about 50% (w/w) of the unseparated waste material.

7. The method of manufacturing a feedstock as defined in claim 1, wherein the particles of unseparated waste material range in size.

8. The method of manufacturing a feedstock as defined in claim 1, further comprising the step of mixing a further additive waste material into the recyclable waste material.

9. The method as defined in claim 8, wherein the further additive waste material is selected from the group consisting of polycarbonate, polyoxymethylene (acetal), poly(methyl methacrylate), polyester, a crystalline polymer, glass, metal powder, ceramic, graphite, graphene, graphene oxide, FRP, GRP, CRP, carbon fibre, gold, cellulose, wood, slag, clay, toner, developer kit powder and iron.

10. The method as defined in claim 8, wherein the further additive waste material is polycarbonate.

11. The method as defined in claim 1, wherein the feedstock comprises a product having a diameter less than 5 mm.

12. The method as defined in claim 1, wherein the feedstock is composed primarily of polymer.

13. The method as defined in claim 1, wherein the step of extruding the material is performed at a temperature low enough to maintain the integrity of at least some of the unseparated waste material.

14. The method of claim 1, further comprising forming the feedstock into filaments or micropellets.

15. The method of claim 14, wherein the filaments or micropellets are used in additive manufacturing, extrusion, injection molding, and blow molding.

* * * * *